United States Patent [19]

Harms et al.

[11] Patent Number: 4,871,500
[45] Date of Patent: Oct. 3, 1989

[54] PROCESS FOR PROVIDING A HIGH-TEMPERATURE RESISTANT POLYIMIDE FILM

[75] Inventors: Haio Harms, Gmunden; Manfred Schobesberger, Seewalchen; Herbert Sollradl, Emmerting; Klaus Weinrotter, Vocklabruck, all of Austria

[73] Assignee: Lenzing Aktiengesellschaft, Lenzing, Austria

[21] Appl. No.: 204,680

[22] Filed: Jun. 9, 1988

[30] Foreign Application Priority Data

Jun. 9, 1987 [AT] Austria .................................. 1446/87

[51] Int. Cl.$^4$ ...................... B29C 47/00; B29C 67/24; B29C 71/02
[52] U.S. Cl. ................................ 264/178 R; 264/233; 264/235; 264/344; 428/473.5
[58] Field of Search ................... 264/178 R, 203, 204, 264/205, 233, 234, 235, 331.19, 331.21, 344, 345, 346; 428/473.5; 528/188, 353

[56] References Cited

U.S. PATENT DOCUMENTS

| | | | |
|---|---|---|---|
| 3,124,631 | 3/1964 | Davis et al. | 264/233 X |
| 3,247,165 | 4/1966 | Rodia | 264/203 X |
| 3,961,009 | 6/1976 | Yoda et al. | 264/205 |
| 4,378,324 | 3/1983 | Makino et al. | 264/235 X |
| 4,426,486 | 1/1984 | Hungerford | 528/353 X |
| 4,470,944 | 9/1984 | Asakura et al. | 264/178 R X |
| 4,473,523 | 9/1984 | Sasaki et al. | 264/204 X |
| 4,485,056 | 11/1984 | Makino et al. | 264/331.19 X |
| 4,551,296 | 11/1985 | Kavesh et al. | 264/203 |
| 4,751,132 | 6/1988 | Benim et al. | 264/178 R X |

FOREIGN PATENT DOCUMENTS 59-161432 9/1984 Japan .................................... 264/203

Primary Examiner—Jeffery Thurlow
Assistant Examiner—Leo B. Tentoni
Attorney, Agent, or Firm—Ostrolenk, Faber, Gerb & Soffen

[57] ABSTRACT

In a process of producing a high-temperature resistant film at a polyimide polymer, a solution of the polymer in an organic solvent is caused to flow out through a slots spinneret of a film forming arrangement and to coagulate in an aqueous precipitation bath containing the organic solvent. The film made up of coagulated liquid is stripped, the organic solvent is removed and the film is dried. In order to attain sufficient strength properties without subsequent orientation and, thus, achieve a better dimensional stability at elevated temperatures, the liquid film formed in the slot spinneret is allowed to fall directly freely into the aqueous precipitation bath through a short air gap. The film formed is drawn off the precipitation bath and is subjected to a subsequent thermal treatment to achieve a transparent homogeneous film. The organic solvent is then removed by treatment with an aqueous extraction agent, and the film is finally dried.

4 Claims, 1 Drawing Sheet

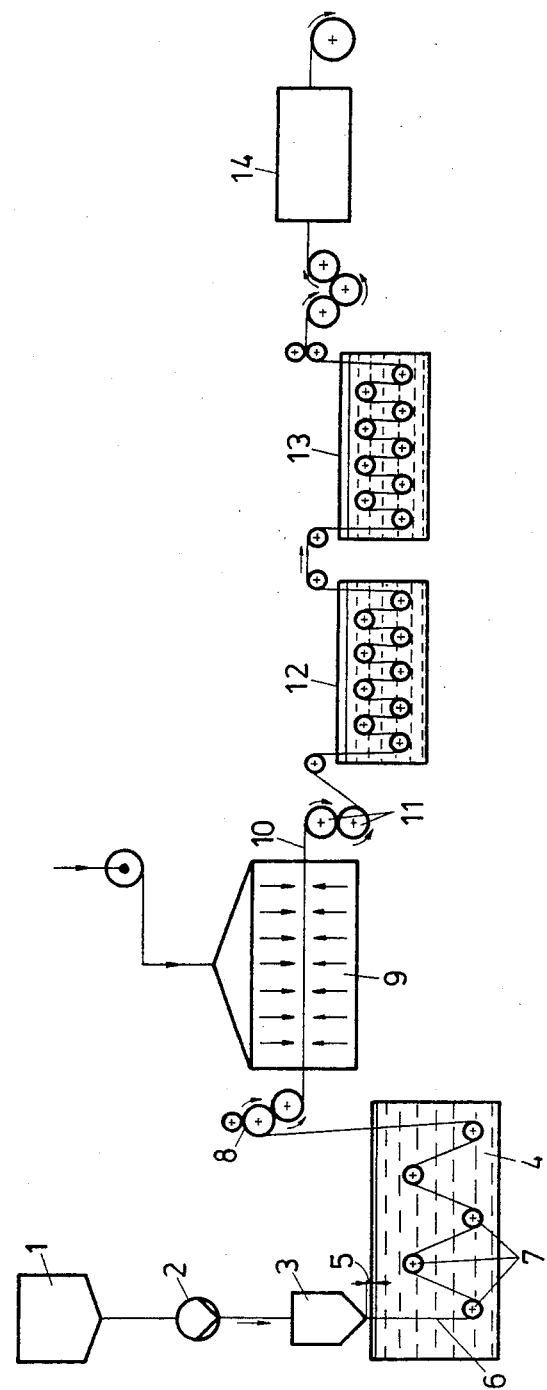

PROCESS FOR PROVIDING A HIGH-TEMPERATURE RESISTANT POLYIMIDE FILM

BACKGROUND OF THE INVENTION

The invention relates to a process of producing high-temperature resistant films of polyimide polymers, wherein a solution of the polymer is an organic solvent is caused to flow out through a slot spinneret of a film former and to coagulate in an aqueous precipitation bath containing the organic solvent. The film made up of coagulated liquid film is stripped, the organic solvent is removed and the film is dried.

As far as high-temperature resistant polyimide polymers go, primarily those may be employed which comprise structural units of the general formula

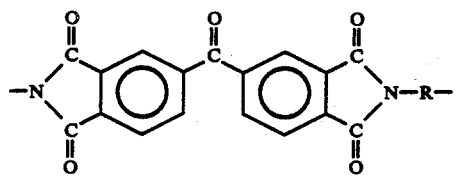

wherein R represents 2,4- and/or 2,6-toluylene or is a group of the formula

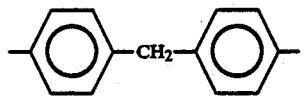

to produce the high-temperature resistant polymer, preferably benzophenone-3,3',4,4'-tetracarbonic acid dianhydride-phenyldiamine 4,4'-methylene-bis(-phenylisocyanate) and 2,4- and 2,6-toluylene diisocyanate are used.

A process of the initially defined kind is known from U.S. Pat. No. 4,426,486. There, a liquid film formed in a slot spinneret of a heated, at least 40% solution of a polyimide polymer in dimethyl formamide is cast onto the surface of a cooled drum. The lower part of the drum is immersed into an extraction bath composed of dimethyl formamide and water; the film formed on the surface of the drum is stripped over a stripping means composed of rolls, the organic solvent is removed during the passage through an aqueous washing bath, and the film finally is dried.

During the film forming stage, the surfaces of the liquid film are in contact with the drum surface on the one hand and with the aqueous extraction bath on the other hand. Thereby, a transparent aquagel film containing about 30% water is formed.

In order to ensure sufficient strength of films produced in such a way, it is necessary to orient the aquagel film in the machine direction and transverse to the machine direction. Subsequently, the film is dried. The biaxial orientation of the film damages the marginal zone of the film; hence undesired waste results which must be separated in the form of a wide edge strip.

The invention has as its object the production of high-temperature resistant films of polyimide polymers, where both surfaces of the liquid film are in equal contact with the precipitation bath during formation of the film and no transparent aquagel is formed. Furthermore, the process aims at making possible the use of commercially available polymer solutions without further concentration. The strength properties are sufficient without orientation, and undesired shrinkage at elevated temperatures is avoided. Moreover, the process aims, by avoiding the uniaxial or biaxial orientation stpe, which leads to an unavoidable loss in the thickness of the film, at producing a thinner and, thus, more readily extractable primary film.

According to the invention, liquid film formed in the slot spinneret is allowed to freely fall directly into the aqueous precipitation bath through a short air gap. The film formed is drawn off the precipitation bath, is subjected to subsequent thermal treatment. The organic solvent is then rermoved by treatment with an aqueous extraction agent, and the film is finally dried.

In this procedure, the white opaque film formed in the precipitation bath is converted into a transparent golden-yellow film by thermal treatment.

Preferably, the thermal treatment of the film formed in the precipitation bath is carried out under supply of hot air at a temperature of 40° to 130° C.

According to a preferred embodiment, the extraction of the thermally treated film is effected in steps, at first with a bath consisting of organic solvent and water and subsequently with pure water, at a temperature of 70° C. to 100° C.

The process according to the invention will be explained in more detail with reference to the accompanying drawing, which is a flow sheet.

A polymer solution (manufacturer: Lenzing AG, commercially available polymer P84) prepared of benzophenone-3,3',4,4'-tetracarbonic acid dianhydride 4-methyl 1,3-phenyldiamine and 4,4'-methylene-bis(-phenylisocyanat) (and 2,4- and 2,6-toluylene diisocyanate) in dimethyl formamide having a polymer concentration of 25% is fed under a pressure of 5 bar from a pressure tank 1 via a toothed wheel pump 2 to a wide slot spinneret 3 having a slot diameter of 0.8 mm. The spinning solution emerging from the slot which forms a film curtain or veil is caused to fall into the precipitation bath 4. Between the spinneret and the surface of the precipitation solution, there is an air gap 5 dimensioned between 3 and 5 mm. It is important to observe this gap or distance in order to avoid the direct contact of the precipitation bath with the slot spinneret.

The precipitation bath essentially consists of a solution of 40 to 80% dimethyl formamide and 20 to 60% water. Its temperature amounts to 10° to 25° C. The film curtain is surrounded by the same media on either side, as it falls through the air gap 5, and also within the precipitation bath 4. Under these conditions, a white opaque film 6 forms instead of a transparent aquagel. The film formed is stripped via deflection pulleys 7 and, upon pre-drying 8, is supplied to a thermal treatment zone 9; in the example illustrated, this zone is formed by a hot-air chamber.

Hot air is supplied to the thermal treatment zone via a fan. As the film passes through the hot-air chamber, it is exposed to a temperature region of 50° C. at its entrance and up to 115° C. at its exit. During this thermal treatment, part of the dimethyl formamide and the total residual water contained are removed, whereby the opaque film is subjected to a kind of phase transition and becomes transparently golden-yellow. Shots of the film with the electronic microscope at this stage, i.e., prior and upon "clearing", reveal that the microporous structure of the opaque film has disappeared and a homogeneous transparent film 10 has been formed.

After the phase transition, the film 10 is heated in the thermal treatment zone for a short period of time, e.g., by means of heating rolls 11, which involves post-drying and solidification (keratinization). This keratinization prevents a secondary precipitation in the following washing baths. The thermally treated film then is extracted with an aqueous medium at least in two steps, whereby an extraction solution of dimethyl formamide/water at a ratio of 60 to 70:40 to 30 and at a temperature of 70° to 95° C. is used as the extraction agent in an extraction tub 12 in the first step, and water having a temperature of 95° C. is used as the extraction agent in an extraction tub 13 in the second step.

Subsequently, the extracted film is squeezed off, is dried in a drier 14 and is cut into sheets.

The film produced has the following properties:

| Thickness | 0,033 mm |
|---|---|
| Tensile strength (MR) | 135 N/mm$^2$ |
| Elongation | 21% |
| Tension modulus | 2,900 N/mm$^2$ |

The glass transition point lies at 310° C., the continuous temperature resistance is at 250° C.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A process for producing a high-temperature resistant film of a polyimide polymer which does not undergo undesired shrinkage at elevated temperatures, comprising providing a solution of said polyimide polymer in an organic solvent, causing said solution to flow out through a slot spinneret of a film forming arrangement so as to obtain a liquid film of said solution, causing said liquid film formed in the slot spinneret to freely fall directly through a short air gap into an aqueous precipitation bath containing said organic solvent to form and to obtain a film made up of coagulated liquid which is white and opaque, stripping said coagulated film from said precipitation bath and subjecting said stripped film to thermal treatment to convert it into a transparent golden-yellow film, and subsequently removing said organic solvent from said transparent golden-yellow film and drying said film.

2. A process as set forth in claim 1, wherein said organic solvent is removed from the thermally treated film by extracting said solvent with an aqueous extraction agent.

3. A Process as set forth in claim 5, wherein said thermal treatment of said film formed in said precipitation bath is carried out by supplying hot air to said film at a temperature of 40° to 130° C.

4. A process as set forth in claim 2, wherein the extraction of solvent from said thermally treated film is carried out in steps at a temperature of about 70° to 100° C., said steps comprising treatment in a first bath consisting essentially of organic solvent and water and treatment in a second bath consisting essentially of water.

* * * * *